(12) United States Patent
Chou et al.

(10) Patent No.: US 8,057,910 B2
(45) Date of Patent: *Nov. 15, 2011

(54) TOUGHENED THERMOPLASTIC POLYAMIDE COMPOSITIONS

(75) Inventors: Richard T. Chou, Hockessin, DE (US); Karlheinz Hausmann, Auvernier (CH); Han Il Lee, Broomfield, CO (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/972,847

(22) Filed: Dec. 20, 2010

(65) Prior Publication Data

US 2011/0086564 A1    Apr. 14, 2011

Related U.S. Application Data

(60) Division of application No. 11/315,988, filed on Dec. 21, 2005, now Pat. No. 7,879,949, which is a continuation-in-part of application No. 10/510,808, filed as application No. PCT/US03/16353 on May 23, 2003, now Pat. No. 7,199,188.

(60) Provisional application No. 60/383,296, filed on May 23, 2002.

(51) Int. Cl.
*B32B 23/08* (2006.01)
*B32B 27/00* (2006.01)
*B32B 27/06* (2006.01)
*B32B 27/08* (2006.01)
*B32B 27/10* (2006.01)

(52) U.S. Cl. ........ 428/461; 428/463; 428/500; 428/507; 428/511; 428/514; 428/515; 428/516

(58) Field of Classification Search .................. 428/461, 428/463, 500, 507, 511, 514, 515, 516
See application file for complete search history.

(56) References Cited

U.S. PATENT DOCUMENTS

| | | | |
|---|---|---|---|
| 3,350,372 A | 10/1967 | Anspon et al. | |
| 3,388,186 A | 6/1968 | Kray et al. | |
| 3,465,059 A | 9/1969 | Seven et al. | |
| 3,668,274 A | 6/1972 | Owens et al. | |
| 3,756,996 A | 9/1973 | Pugh et al. | |
| 3,845,163 A | 10/1974 | Murch | |
| 3,969,434 A | 7/1976 | Powell et al. | |
| 4,174,358 A | 11/1979 | Epstein | |
| RE30,322 E | 7/1980 | Hammer et al. | |
| 4,230,830 A | 10/1980 | Tanny et al. | |
| 4,351,931 A | 9/1982 | Armitage | |
| 4,552,819 A | 11/1985 | Hibino | |
| 4,861,676 A | 8/1989 | Lee | |
| 4,861,677 A | 8/1989 | Lee | |
| 5,028,674 A | 7/1991 | Hatch et al. | |
| 5,114,658 A | 5/1992 | Katsaros | |
| 5,225,482 A | 7/1993 | Nakagawa et al. | |
| 5,283,120 A | 2/1994 | Koehnlein et al. | |
| 5,346,963 A | 9/1994 | Hughes et al. | |
| 5,401,562 A * | 3/1995 | Akao | 428/211.1 |
| 5,408,000 A | 4/1995 | Katsaros et al. | |
| 5,516,583 A | 5/1996 | Zhang et al. | |
| 5,532,066 A | 7/1996 | Latiolais et al. | |
| 5,859,137 A | 1/1999 | Chou | |
| 5,965,255 A | 10/1999 | Ichimura et al. | |
| 6,008,297 A | 12/1999 | Tanaka et al. | |
| 6,177,516 B1 | 1/2001 | Hudak | |
| 6,465,107 B1 | 10/2002 | Kelly | |
| 6,528,550 B1 | 3/2003 | Hsu et al. | |
| 6,756,443 B2 | 6/2004 | Feinberg | |
| 7,270,862 B2 | 9/2007 | Flat et al. | |
| 7,279,520 B2 | 10/2007 | Hausmann et al. | |
| 7,534,829 B2 * | 5/2009 | Tai et al. | 524/503 |
| 2005/0228145 A1 | 10/2005 | Lacroix et al. | |
| 2006/0025527 A1 | 2/2006 | Chou | |
| 2006/0052511 A1 | 3/2006 | Fan et al. | |
| 2006/0160952 A1 | 7/2006 | Chou et al. | |
| 2007/0155904 A1 | 7/2007 | Chou | |
| 2008/0255303 A1 | 10/2008 | Chou | |
| 2009/0215928 A1 | 8/2009 | Chou et al. | |
| 2009/0227739 A1 | 9/2009 | Chou | |
| 2009/0274856 A1 | 11/2009 | Chou | |
| 2009/0298372 A1 | 12/2009 | Chou et al. | |
| 2010/0129665 A1 * | 5/2010 | Chou | 428/424.8 |

FOREIGN PATENT DOCUMENTS

| | | |
|---|---|---|
| EP | 0359426 | 3/1990 |
| EP | 0270924 | 6/1993 |
| GB | 1157569 | 7/1969 |
| WO | 01/18141 | 3/2001 |
| WO | 02/28974 | 4/2002 |
| WO | 02/102898 | 12/2002 |
| WO | 03/099930 | 12/2003 |

OTHER PUBLICATIONS

Richard T. Chou, U.S. Appl. No. 12/276,822, Laminated Articles Comprising a Sheet of a Blend of Ethylene Copolymers, filed Nov. 24, 2008.

* cited by examiner

*Primary Examiner* — Nathan M Nutter

(57) ABSTRACT

Disclosed are high frequency-active blends comprising (a) copolymers of ethylene and maleic anhydride or its functional equivalents and (b) ethylene copolymers with polar comonomers such as ethylene/vinyl acetate copolymers, ethylene/alkyl (meth)acrylate copolymers and ethylene/(meth)acrylate/carbon monoxide terpolymers; and films, powders, multilayer structures, and articles prepared therefrom.

19 Claims, No Drawings

TOUGHENED THERMOPLASTIC POLYAMIDE COMPOSITIONS

CROSS REFERENCE TO RELATED APPLICATIONS

This application is a division of U.S. application Ser. No. 11/315,988, filed Dec. 21, 2005, and now U.S. Pat. No. 7,879, 949, which is a continuation-in-part of U.S. application Ser. No. 10/510,808 filed Oct. 6, 2004, now U.S. Pat. No. 7,199, 188B2 which is the U.S. national stage application of International Application No. PCT/US03116353, filed May 23, 2003 and published as WO03/099930A1, which claims the benefit of U.S. Provisional Application Ser. No. 60/383,296, filed May 23, 2002.

FIELD OF THE INVENTION

This invention relates to high frequency-active blends. This invention particularly relates to high frequency active blends comprising ethylene/maleic anhydride copolymers and copolymers of ethylene with polar comonomers and films, powders, multilayer structures, and articles prepared therefrom.

BACKGROUND OF THE INVENTION

High frequency (HF) welding is useful in flexible packaging, flexible bag production, textile lamination, and in producing automotive components such as headliners and sunvisors. HF welding is an alternative to heat-bonding methods for adhering a film to a substrate such as the film itself, another film, or a textile fabric. HF welding involves heating only a HF-active component or HF-active layer of a structure such as a multilayer film sufficiently to soften that component. The selective heating is accomplished by treatment with high frequency radiation. In contrast, heat-bonding methods require transferring heat through an entire structure to soften a bonding layer or component in the structure. In each case, the softened layer or component subsequently bonds the film structure to a substrate.

HF welding can be advantageous over heat-bonding methods. First, HF welding can bond a film in a fraction of the time required for heat-bonding methods. Second, HF welding is less likely to degrade thermally sensitive material, such as oriented films and thermally sensitive dyes. Third, bonding complex shapes is possible using HF welding.

Flexible polyvinyl chloride (f-PVC) has been used in HF-active films due to its HF sealing capability, vapor and gas barrier properties, and flexibility. Films of f-PVC typically include a plasticizer, typically a phthalate plasticizer, to enhance film flexibility. The plasticizer can migrate out of the polymer over time, decreasing film flexibility and potentially contaminating materials in contact with the film. A desire for long-term flexibility and concern about the environmental impact of halogenated polymers, such as f-PVC, make it desirable to have another HF-active polymer as an alternative to f-PVC.

Olefin/acrylate copolymers and olefin/vinyl ester copolymers demonstrate HF activity when they contain greater than about 12 weight percent of a polar comonomer such as alkyl acrylate or vinyl ester. Such a high level of polar comonomer reduces a polymer's crystalline melting point ($T_m$) below 100° C., and generally below 90° C. Polymers having such a low $T_m$ are not suitable for use in many articles where a film must maintain physical integrity through multiple exposures to temperatures around, and particularly above, 100° C. Examples of such articles include many textiles, such as clothing articles, which are subject to repeated washing and drying cycles. Additional examples of such articles include sun visors for automotive interiors. Olefin/acrylate and olefin/vinyl ester copolymers also tend to have a lower dielectric loss factor (DLF) than f-PVC. A lower DLF means more HF energy is necessary to weld the copolymers with HF than needed for f-PVC. Addition of HF-active fillers can help increase the DLF of a copolymer film, but may do so at the expense of physical properties such as tensile strength.

Commercially cost effective HF-active film-forming polymer compositions and HF-active films that have long-term flexibility and $T_m$ greater than 90° C. are desirable as alternatives to f-PVC compositions and films. Preferably, the polymer compositions and films are also essentially halogen-free.

PCT Patent Application publication WO2002/102898 discloses a blend of 20 to 80 percent, by weight, of a low weight-average molecular weight copolyester with a carboxyl-containing polyolefin that has a dielectric loss (DLF) factor of 0.05 or more at 27 MHz and 23° C. This composition is reported to be HF-active.

It can be desirable to replace f-PVC with a HF-weldable composition that can remain flexible without the inclusion of a plasticizer, and which is compatible with the environment.

BRIEF SUMMARY OF THE INVENTION

In one aspect the present invention is a composition suitable for use in a high-frequency welding process, the composition comprising:

(a) a copolymer obtained by copolymerization of ethylene and maleic anhydride or a functional equivalent thereof, wherein maleic anhydride or its functional equivalent is present in the copolymer in an amount of from 3 to 15 weight %, in an amount of from about 5 to about 95 weight % of the composition; and (b) at least one ethylene copolymer present in an amount of from about 5 to about 95 weight % of the composition, wherein the copolymer is obtained by copolymerization of ethylene with a polar monomer, wherein said polar comonomer is present in the copolymer in an amount of from 6 to 40 weight %, and wherein said copolymer is selected from the group consisting of ethylene/vinyl acetate copolymers, ethylene/alkyl (meth)acrylate copolymers and ethylene/(meth)acrylate/carbon monoxide terpolymers.

In another aspect the present invention is a polymeric film comprising a composition suitable for use in a high-frequency welding process, the composition comprising:

(a) a copolymer obtained by copolymerization of ethylene and maleic anhydride or a functional equivalent thereof, wherein maleic anhydride or its functional equivalent is present in the copolymer in an amount of from 3 to 15 weight %, in an amount of from about 5 to about 95 weight % of the composition; and (b) at least one ethylene copolymer present in an amount of from about 5 to about 95 weight % of the composition, wherein the copolymer is obtained by copolymerization of ethylene with a polar monomer, wherein said polar comonomer is present in the copolymer in an amount of from 6 to 40 weight %, and wherein said copolymer is selected from the group consisting of ethylene/vinyl acetate copolymers, ethylene/alkyl (meth)acrylate copolymers and ethylene/(meth)acrylate/carbon monoxide terpolymers.

In another aspect, the present invention is a powder comprising a composition suitable for use in a high-frequency welding process, the composition comprising:

(a) a copolymer obtained by copolymerization of ethylene and maleic anhydride or a functional equivalent thereof, wherein maleic anhydride or its functional equivalent is present in the copolymer in an amount of from 3 to 15 weight %, in an amount of from about 5 to about 95 weight % of the composition; and (b) at least one ethylene copolymer present in an amount of from about 5 to about 95 weight % of the composition, wherein the copolymer is obtained by copolymerization of ethylene with a polar monomer, wherein said polar comonomer is present in the copolymer in an amount of from 6 to 40 weight %, and wherein said copolymer is selected from the group consisting of ethylene/vinyl acetate copolymers, ethylene/alkyl (meth)acrylate copolymers and ethylene/(meth) acrylate/carbon monoxide terpolymers.

In still another aspect, the present invention is a multilayer film structure comprising at least one layer comprising:

(a) a copolymer obtained by copolymerization of ethylene and maleic anhydride or a functional equivalent thereof, wherein maleic anhydride or its functional equivalent is present in the copolymer in an amount of from 3 to 15 weight %, in an amount of from about 5 to about 95 weight % of the composition;

(b) at least one ethylene copolymer present in an amount of from about 5 to about 95 weight % of the composition, wherein the copolymer is obtained by copolymerization of ethylene with a polar monomer, wherein said polar comonomer is present in the copolymer in an amount of from 6 to 40 weight %, and wherein said copolymer is selected from the group consisting of ethylene/vinyl acetate copolymers, ethylene/alkyl (meth)acrylate copolymers and ethylene/(meth) acrylate/carbon monoxide terpolymers; and, (c) at least one additional layer comprising a substrate selected from the group consisting of thermoplastic film and sheet, cellular foams, woven and non-woven fabrics, foil, paper and paperboard products, leather and leather-like products, wood veneer and wood products, and wood and cellulosic composites.

This invention further provides articles of manufacture comprising the film and multilayer structures described above.

DETAILED DESCRIPTION OF THE INVENTION

All references disclosed herein are incorporated by reference.

"HF-weldable", "HF-sealable" are interchangeable terms and refer to compositions comprising an exposed HF-active component. For example, an HF-weldable film has HF-weldable material on an exposed film surface, that is, a film surface that can be irradiated with an HF-radiation source. The HF-active material can be a separate layer of the film or in the form of lines, strips, dots, or other patterns on the surface of the film. Preferably, the HF-active material is a separate layer.

The term copolymer takes on its ordinary meaning, that is, a polymer obtained by the copolymerization of two or more different monomers. The term "dipolymer" is a copolymer comprising only two different monomers, and "terpolymer" is a copolymer comprising only three different monomers.

As used herein, the term "(meth)acrylic acid" shall be shorthand notation which shall be taken to mean compositions comprising methacrylic acid and/or acrylic acid. Likewise, the term "(meth)acrylate" shall be shorthand notation which shall be taken to mean compositions comprising methacrylate and/or acrylate.

Thermoplastic compositions are polymeric materials that can flow when heated under pressure. Melt index (MI) is the mass rate of flow of a polymer through a specified capillary under controlled conditions of temperature and pressure. Melt indices reported herein are determined according to ASTM 1238 at 190° C. using a 2160 g weight, with values of MI reported in grams/10 minutes.

The compositions useful in the practice of the present invention comprise a copolymer obtained by copolymerization of at least ethylene and at least one anhydride, or a functional equivalent thereof, that is capable of copolymerization with ethylene. For example, maleic anhydride or its functional equivalents are suitable for use in the practice of the present invention. Maleic anhydride equivalents include derivatives of maleic anhydride such as, for example, maleic acid and/or salts thereof, maleic acid diesters, maleic acid monoesters, itaconic acid, fumaric acid, fumaric acid monoester, and/or mixtures of any of these. Maleic diesters or monoesters (maleic half-esters) include esters of $C_1$ to $C_4$ alcohols, such as, for example, methyl, ethyl, n-propyl, isopropyl, and n-butyl alcohols. Preferably the copolymer comprises ethylene and maleic anhydride, and/or a maleic monoester, such as ethyl hydrogen maleate (EHM).

Preferred are copolymers of ethylene and monoalkyl maleates (also known as alkyl hydrogen maleates). As used herein, the term "ethylene/monoalkyl maleate copolymers" refers to such copolymers prepared from ethylene and a maleic acid monoester (sometimes referred to as a "half-ester, wherein one carboxyl group of the maleic moiety is esterified and the other is an unesterified carboxylic acid). The copolymers also include E/X/Y terpolymers, wherein E is ethylene; X is a monomer selected from the group consisting of vinyl acetate, and alkyl (meth)acrylates, and (meth)acrylic acids; and Y is a maleic acid monoester, including maleic monoesters of $C_1$ to $C_4$ alcohols, such as for example, methyl, ethyl, n-propyl, isopropyl, and n-butyl alcohols, wherein X is less than 10 weight %, and preferably less than 5 weight % of the terpolymer. Examples of monomers suitable for inclusion as component X are (meth)acrylic acid esters of $C_1$ to $C_4$ alcohols. Methyl acrylate and butyl acrylate are particular examples of acrylate monomers suitable as component X.

Other suitable copolymers include ethylene/maleic acid monoester/n-butyl (meth)acrylate, ethylene/maleic acid monoester/methyl (meth)acrylate, and ethylene/maleic acid mono-ester/ethyl (meth)acrylate terpolymers. For such copolymers, the alcohol moiety used in the maleic acid monoester comonomer may be the same as that used in the alkyl (meth)acrylate comonomer, or it may be different. Of particular note are ethylene/alkyl hydrogen maleate copolymers wherein the alkyl group is ethyl.

Ethylene/monoalkyl maleate copolymers useful in this invention can be obtained by a high-pressure free radical polymerization process. A high-pressure process suitable for use in the practice of the present invention is described, for example, in U.S. Pat. No. 4,351,931, the teachings therein incorporated herein by reference.

Polar Ethylene Copolymers

Compositions of the present invention comprise a second component (b), which is at least one copolymer obtained from copolymerization of ethylene with a polar monomer (that is, a polar ethylene copolymer). Suitable copolymers include ethylene vinyl acetate copolymers (EVA's) and ethylene (meth)acrylate copolymers and/or mixtures of any of these. Ethylene (meth)acrylate copolymers include ethylene acrylic ester copolymers and ethylene methacrylic ester copolymers. Combinations of two or more different polar ethylene copolymers can be suitable. For example, combinations of two or more polar ethylene copolymers with different polar comonomers can be suitable, as can be combinations of two or more polar ethylene copolymers having identical monomers but with different amounts of said monomers.

Ethylene/Vinyl Acetate Copolymers

A composition of the present invention can comprise at least one ethylene/vinyl acetate copolymer (an EVA copolymer), or blends thereof.

The weight percentage of vinyl acetate monomer incorporated into an EVA copolymer suitable for use herein can vary from about 2 weight percent up to about 45 weight percent, based on the total weight of the copolymer. The amount of vinyl acetate suitable for use herein can be even greater, however, and can be varied to obtain a desirable degree of polarity sought for the blended composition.

The ethylene/vinyl acetate copolymer preferably has a vinyl acetate unit content of from about 6 to about 40% by weight, more preferably from about 12 to about 32% by weight. The ethylene/vinyl acetate copolymer may optionally be modified by methods well known in the art, including modification with an unsaturated carboxylic acid or its derivatives, such as maleic anhydride or maleic acid. The ethylene/vinyl acetate copolymer preferably has a melt index, measured in accordance with ASTM D 1238 at 190° C., of from about 0.1 to about 1000 g/10 minutes, and more preferably from about 0.3 to about 30 g/10 minutes.

Ethylene/vinyl acetate copolymers suitable for use in this invention include those available from E. I. du Pont de Nemours & Co. (DuPont), Wilmington, Del. under the Elvax® tradename.

A mixture of two or more different ethylene/vinyl acetate copolymers can be used in the compositions for the present invention in place of a single copolymer as long as the average values for the comonomer content will be within the range indicated above. Particularly useful properties may be obtained when two or more properly selected ethylene/vinyl acetate copolymers are used in blends of the present invention.

Ethylene/Alkyl Acrylate Copolymers

As used herein, ethylene/alkyl acrylate copolymers include copolymers of ethylene and alkyl acrylates wherein the alkyl moiety contains from one to six carbon atoms. Examples of alkyl acrylates include methyl acrylate, ethyl acrylate and butyl acrylate. "Ethylene/methyl acrylate" (EMA) means a copolymer of ethylene and methyl acrylate. "Ethylene/ethyl acrylate" (EEA) means a copolymer of ethylene and ethyl acrylate. "Ethylene/butyl acrylate" (EBA) means a copolymer of ethylene and butylacrylate. Of note are ethylene/butyl acrylate copolymers prepared from i-butyl acrylate comonomers (EiBA) and ethylene/butyl acrylate copolymers prepared from n-butyl acrylate comonomers (EnBA).

The relative amount of the alkyl acrylate comonomer incorporated into ethylene/alkyl acrylate copolymer can, in principle, vary broadly from a few weight percent up to as high as 40 weight percent of the total copolymer or even higher. Similarly, the alkyl group can comprise from 1-carbon to 6-carbon groups, that is to say the alkyl group can vary from a methyl group up to and inclusive of branched and/or unbranched propyl, butyl, pentyl, and hexyl groups. The relative amount and choice of the alkyl group present in the alkyl acrylate ester comonomer can be used to manipulate the polarity of the composition.

Preferably, the alkyl group in the alkyl acrylate comonomer has from one to four carbon atoms and the alkyl acrylate comonomer has a concentration range of from 6 to 40 weight percent of the ethylene/alkyl acrylate copolymer, preferably from 12 to 32 weight %.

Ethylene/alkyl acrylate copolymers can be prepared by processes well known in the polymer art using either autoclave or tubular reactors. The copolymerization can be run as a continuous process in an autoclave: ethylene, the alkyl acrylate, and optionally a solvent such as methanol (see U.S. Pat. No. 5,028,674) are fed continuously into a stirred autoclave such as the type disclosed in U.S. Pat. No. 2,897,183, together with an initiator.

In a particularly preferred embodiment, the ethylene copolymer is of the type that is prepared in a tubular reactor, according to the procedure described in the article "High Flexibility EMA Made from High Pressure Tubular Process" (Annual Technical Conference-Society of Plastics Engineers (2002), 60th (Vol. 2), 1832-1836).

Preferably the ethylene copolymer is obtained in a high pressure, tubular reactor at elevated temperature with additional introduction of reactant comonomer along the tube and not merely manufactured in a stirred high-temperature and high-pressure autoclave type reactor. However, it should be appreciated that similar ethylene/alkyl acrylate copolymeric material can be produced in a series of autoclave reactors wherein comonomer replacement is achieved by multiple zone introduction of reactant comonomer as taught in U.S. Pat. Nos. 3,350,372; 3,756,996; and 5,532,066, and as such these high melting point materials should be considered equivalent for purposes of this invention.

Ethylene/alkyl acrylate copolymers suitable for use in the present invention include those available from DuPont) under the Elvaloy® AC tradename.

The ethylene/alkyl acrylate copolymers useful in the present invention can vary significantly in molecular weight as witnessed by ethylene/alkyl acrylate copolymers having a melt index numerically in terms of a fraction up to about ten. Of note is an ethylene/methyl acrylate copolymer, comprising 24 weight % methyl acrylate, with an MI of 2 g/10 min.

Mixtures of two or more ethylene/alkyl (meth)acrylate copolymers is contemplated as within the scope of the present invention.

Compositions used in the present invention may further comprise optional polymers including polyolefins such as, for example, homopolymers and copolymers of polyethylene and/or polypropylene. The optional polymer(s) can be present in amounts up to about 25 weight % of the total composition, so long as they do not detract from the basic and novel characteristics of the composition and do not significantly adversely affect the desirable performance characteristics, such as the adhesive properties for example, of the composition.

The compositions used in the present invention can additionally comprise optional materials commonly used and well known in the polymer art. Such materials include plasticizers, stabilizers including viscosity stabilizers and hydrolytic stabilizers, primary and secondary antioxidants, ultraviolet ray absorbers, anti-static agents, dyes, pigments or other coloring agents, inorganic fillers, fire-retardants, lubricants, reinforcing agents such as glass fiber and flakes, foaming or blowing agents, processing aids, slip additives, antiblock agents such as silica or talc, release agents, tackifying resins and/or mixtures thereof. Some suitable additives are described in the Kirk Othmer *Encyclopedia of Chemical Technology*, for example.

Polymer compositions used in the present invention are HF-active in the absence of HF-active fillers. Nonetheless, the polymer composition optionally may contain at least one HF-active filler as an additive to enhance HF-activity or to modify some other property of the composition. Examples of HF-active fillers include aluminum trihydrate, magnesium hydroxide, and sodium aluminosilicate.

If present, the optional additives described above may be present in the compositions of the present invention in quantities of from about 0.01 to 15 weight %, preferably from 0.01 to 10 weight %, or from 0.01 to 5 weight %, so long as they do not detract from the basic and novel characteristics of the composition and do not have a significant adverse affect the performance properties, such as the adhesive properties, of the composition in the amounts used. For the avoidance of doubt, the weight percentages provided for the compositions described herein do not include the presence of optional components, unless otherwise stipulated.

The components used in the compositions can be dry blended and subsequently melt blended in a twin-screw extruder and repelletized as is known in the art. For example, the blends can be prepared by melt mixing the components in a 30-mm twin-screw extruder, using a melt temperature of from 180° C. to 230° C.

Melt-blended resins of the present invention can be converted by a variety of techniques and processes known to one of ordinary skill in the art. For example, the composition can be converted into a film or sheet by cast or blown film die extrusion techniques. As an alternative, the composition can be coextruded with other thermoplastic polymers to provide a multilayer structure. As a further alternative, a coextruded film can be created incorporating polar barrier resins such as polyamides, ethylene vinyl alcohol copolymer (EVOH) or polyester.

In other applications a composition as described herein can be directly coated onto a substrate by processes well known in the art, including, for example, extrusion lamination, extrusion coating, coextrusion lamination and coextrusion coating. These techniques involve laying down a molten curtain of the polymer onto the substrate, or between substrates moving at high speeds as they come into contact with a cold roll.

Alternatively, a composition as described herein can be prepared as a powder with granular sizes of up to 600, alternatively up to 400, alternatively up to 200, microns in size. A powder composition of the present invention can comprise granules that vary in size from about 100 to about 600 microns. The average particle size in a powder composition of the present invention can be from about 150 to about 200 microns. The compositions can be milled, pulverized or otherwise processed by methods known in the art to provide a desired particle size suitable for application to a substrate.

The powder can be applied to a substrate by a technique such as powder scattering, wherein the powder is evenly distributed across a working width of a substrate and thereafter melted, smoothed, and cooled to provide a uniform coating of the composition on the substrate. Such a process can be suitable for use in the automobile industry for carpet backing, to prepare conveyor belts, interlinings, medical textiles, and in other clothing applications.

The powder can be used in powder dot processes wherein the powder can be placed in cavities of a heated engraved roller and transferred to a preheated substrate in a pattern, sintered in an infra-red channel, and calendared in a smoothing unit. Powder dot processes can be used to prepare interlinings for lightweight outerwear, and fixing materials for shirt collars, shoe insoles, outerwear and other clothing applications.

A powder composition of the present invention can be used in paste dot applications for light and temperature sensitive substrates. A dispersion of the powder can be applied in a pattern of dots to a substrate by a rotating printing screen. The paste dots can be dried using a hot air nozzle dryer.

Substrates of interest include thermoplastic film and sheet, cellular foams (such as polyurethane, polystyrene, and polyolefin foams), woven and non-woven fabrics, foil, paper and paperboard products, leather and leather-like products, wood veneer and wood products, and wood and cellulosic composites.

The compositions may also be processed by various molding techniques such as injection molding, compression molding, injection blow molding and the like.

Tubular profiles of the HF-active compositions are also within the scope of the present invention. Tubular profiles are useful for forming HF-active tubing suitable for thermally welding or HF welding to HF active films to form, for example, medical collection bags, infusion bags, and other liquid containment or inflatable devices that require tubing attachments.

The compositions described herein are particularly well suited for preparing HF-active films, multilayer structures, or articles. HF-active films and articles are weldable to themselves or other substrates using a HF process that incorporates a HF welder, preferably a radio-frequency (RF) welder. HF welders include RF welders and microwave welders. Commercially available HF welders include those available from Callanan Company (Alloyd RF Sealing Systems), Weldan, Colpitt, Kiefel Technologies, Thermatron, and Radyne. RF welders typically operate at a frequency of 27.12 MHz, 13.56 MHz, or 40.68 MHz. Microwave welders may also be suitable for welding or sealing films of the present invention and typically operate at a frequency of 2.45 gigahertz (GHz), 5.87 GHz, or 24.12 GHz. HF welding of films of the present invention generally involves operating a HF sealing apparatus with a die or tooling temperature set at 23° C. or higher. Increasing the die or tooling temperature can improve HF activation of the HF-active polymer composition, thereby reducing seal time. Die or tooling temperatures can be 40° C. or higher, even 60° C. or higher, but are generally lower than 120° C. for HF welding films of the present invention. Die or tooling temperatures higher than the weight-average $T_m$ of a film usually heat-seal or melt-weld the film to a substrate and are generally higher than is necessary for HF welding.

HF-active films of the present invention can be of any gauge. Typically, the gauge is from 1 to 100 mils (25 to 2500 micrometers (μm), preferably from 5 to 50 mils (125 to 1000 μm). The HF-active films preferably exhibit tensile strengths in the machine direction (MD) and transverse direction (TD) of greater than 2,000 psi (14 MPa), ultimate elongations of greater than 400%, and 2% secant modulus values of 4,000 psi (28 MPa) to 30,000 psi (207 MPa) when tested according to ASTM method D-882. More preferably, the HF-active films further exhibit MD and TD Elmendorf tear strengths of greater than 200 grams/mil (8 grams/μm) when tested according to ASTM method D-1922. Films having these aforementioned properties are sufficiently durable for subsequent conversion operations such as thermal lamination and HF-welding and for end use applications such as medical bags, textile laminates, and automotive interior laminates.

Films of the present invention are also capable of thermal lamination, sealing, and welding using thermal processes such as hot roll lamination, flame lamination, and heat sealing. A combination of a thermal process with a HF process is also feasible. For example, thermally laminating a film of the present invention to a substrate such as a fabric can form a film/fabric composite. HF-welding two such film/fabric composites together at a film/film interface (or folding the same film/fabric composite back on itself to form a film/film interface) can provide a fabric/film/fabric multilayer structure.

One embodiment of the present invention is a HF-weldable multilayer film comprising an exposed HF-active polymer layer and a HF-inactive layer. Of note are multilayer films of the present invention that have "AB", or "ABA" structures, wherein "A" corresponds to a HF-active layer and "B" corresponds to a HF-inactive or weakly HF-active layer. "ABC"-type structures are also suitable, wherein "C" is an HF-inactive or weakly active layer different from "B". Any number of different or repeated layers are conceivable within the scope of this invention, provided at least one layer, preferably at least one exposed layer, is HF-active.

HF-active films of the present invention can comprise at least one adhesive layer. Adhesive layers may be, for example polar-functional ethylene copolymers such as EVA, EEMA, EVA-grated MAH, EAA, or low molecular weight thermoplastic adhesives such as copolyester, copolyamide or polyurethane. Additionally, HF-active films may contain liquid applied emulsions or dispersions. The emulsions or dispersions may be aqueous or solvent borne, thermoplastic or thermosetting. Adhesive layers are useful for bonding materials to HF-active films while desirably preserving an exposed HF-active layer.

HF-active films and articles of the present invention have many uses. For example, layering two sheets of HF-active film, or folding the same HF-active film onto itself and HF-sealing around a perimeter of the sheet(s) forms a bag or a pouch. Such bags can be suitable for medical applications such as fluid delivery bags or liquid waste collection bags, liquid containment, gel packages such as for hot packs and colds packs, and beverage containment pouches.

One particularly useful application is for manufacturing designs capable of being laminated onto clothing. Films of the present invention exhibit a desirable temperature resistance, water and detergent resistance, flexibility, elasticity, and adhesion to fabrics and textiles, making them well suited for clothing applications such as adhesive interlinings, stitched seam taping or water-resistant coatings. Similarly, the HF-active compositions can be used to prepare decorative films or appliqués for, for example, athletic shoe applications.

HF-active films of the present invention may be flocked films having short fibers adhered to a surface of the HF-active film. For example, HF-active flocked films generally contain a liquid adhesive disposed on a surface of an HF-active film with flocking fiber disposed on a surface of the adhesive remote from the HF-active film. Drying or curing the adhesive bonds the flocking fiber to the HF-active film. Suitable flocking fibers include polyester, nylon, rayon, or other natural or synthetic fibers that are generally about 0.5 mm or greater in length. Suitable liquid adhesives include aqueous and solvent-borne thermoplastic or thermosetting adhesives. Such adhesives often are based on acrylic, urethane, epoxy, or polyvinyl acetate chemistry. Desirably, flocked films contain flocking on one surface and an HF-active layer on an opposing surface. HF-welding can adhere such a flocked film to a woven or non-woven substrate, such as a garment. One particularly useful application for HF-active flocked films is in preparing athletic apparel or decorative clothing with flocked film designs HF welded thereon. Flocked HF-active films generally have a felt-like or velour-like feel on the flocked surface.

HF-active films of the present invention having a weight-average $T_m$ of greater than 100° C. are particularly well suited for high temperature applications including automotive interior lamination, especially to woven or nonwoven textiles. An automotive sun visor, for example, can comprise an HF-active film thermally laminated to a fabric to form a film/fabric composition, with the film/fabric composition HF welded around a rigid core. Additionally, film/fabric laminates containing films of the present invention are useful in fabricating into headliner structures, door panels, seating covers, and carpet mats.

Although HF-welding techniques are described above for films comprising the composition described herein, similar HF-welding techniques can be used to adhere other types of articles such as those prepared from the composition using, for example, powder scattering, powder dot and paste dot processes.

While the invention has been particularly shown and described with reference to the preferred embodiments thereof, it will be understood by those skilled in the art that various changes in form and details may be made without departing from the spirit and scope of the invention.

The following Examples are merely illustrative and are not to be construed as limiting the scope of the invention described and/or claimed herein.

EXAMPLES

Tests Used

Tensile strength, elongation at break and tensile strength at 100% elongation were measured according to ASTM D882.

Graves tear strength was measured according to ASTM D1004%

Shore A hardness was measured according to ASTM D2240.

Temperature resistance was determined in an oven creep test according to the following procedure. A 100-gram weight was attached to a film sample having a thickness of 10 mils, a length of six inches and a width of one inch. The 10 mil films were prepared by press-molding at 190° C. The sample was heat aged in an oven with temperature varied from 70 to 100° C. with 5-degree increments. The temperature at which the film was deformed with more than 10% of elongation or breaks is reported in the Tables below as the Temperature Resistance.

Cast films are prepared using a slot die cast film line with a 28-mm diameter, 28:1 length to diameter ratio (L/D) twin screw extruder operating with ramped extruder zone temperatures of 160° C. to 180° C., and a 10-inch wide slot die operating at temperature of 180° C. to cast a melt-processable polymer onto a chilled 20° C. casting roll, forming monolayer films of varied thickness.

The Radio Frequency (RF) welding study was conducted by using a Solidyne Industrial RF Generator that has a maximum output of 10 kW and operates at 27 MHz. Two separate plastic film sheets were placed between two electrodes. The electrodes were pressed together with compressed air at 60 psi on a two-inch diameter ram. The electric field strength was adjusted from 2.0 kV to 9.5 kV by increasing or decreasing the voltage across the electrodes. For example, RF energy was applied to the film samples at 4.0 kV for 3 seconds of weld time and then the welded sample was held together under pressure for 2 seconds, allowing the melted polymer to set. The two layers of the HF sealed films were peeled apart by hand to assess seal strength and rated as follows:

Excellent: A HF seal is "excellent" when the two films cannot be separated without rupture of the seal.

Good: A HF seal is "good" when the two films can be separated with effort.

Poor: A HF seal is "poor" when the two films can be separated with ease.

No: The two films did not seal under the HF treatment.

Materials Used

EVA-1 is an ethylene/vinyl acetate copolymer (25 weight % VA) with MI of 2, available from DuPont as Elvax® 360.

EVA-2 is an ethylene/vinyl acetate copolymer (25 weight % VA) with MI of 19, available from DuPont as Elvax® 350.

F-1 is a polyethylene/ethyl maleic acid monoester copolymer having 90.5 weight % E and 9.5 weight % EHM) with MI of 30.

EMA-1 is an ethylene/methyl acrylate copolymer (24 weight % MA) with MI of 2, available from DuPont.

EMAA-1 is an ethylene/methacrylic acid copolymer (4 weight % MAA) with MI of 7.

EMAA-2 is an ethylene/methacrylic acid copolymer (9 weight % MAA) with MI of 3.

EAA-1 is an ethylene/acrylic acid copolymer (9 weight % AA) with a MI of 10, also comprising an antioxidant.

PP-1 is a homopolypropylene with MI of 3.4 and a density of 0.90 g/cc.

All parts and percentages are given by weight unless otherwise indicated.

The compositions used in the Examples in Tables 1, 2 and 3 were prepared by melt blending using a 30-mm diameter twin screw extruder with a mixing screw, using a melt temperature of from 180° C. to 230° C. The compositions were converted to films as described above or to samples appropriate for the tests listed above.

The data provided in Tables 1 and 2 demonstrate the unexpected properties of films of this invention. The highlighted properties are upper usage temperature (temperature resistance) and HF welding capability, which are most relevant to critical requirements of potential applications of this invention.

Table 1 summarizes the properties of blends of an Ethylene/vinyl acetate copolymer (EVA-1) and E/EHM (F-1).

TABLE 1

Blends of E/EHM and EVA

| Example | Composition (weight ratio) | Tensile Strength (psi) | Elongation at Break (%) | Tensile Strength at 100% Elongation (psi) | Shore A Hardness (psi) | Tear Strength lb/mil resistance | Temperature Resistance (° C.) | HF Welding |
|---|---|---|---|---|---|---|---|---|
| C1 | EVA-1 | 3130 | 1000 | 650 | 86 | 0.35 | 60 | Excellent |
| C2 | F-1 | 1800 | 460 | 1500 | 94 | 0.44 | 105 | No |
| 1 | EVA-1/F-1 (70/30) | 2460 | 900 | 750 | 88 | 0.35 | 80 | Excellent |
| 2 | EVA-1/F-1 (60/40) | 2430 | 850 | 750 | 90 | 0.41 | 90 | Excellent |
| 3 | EVA-1/F-1 (50/50) | 2600 | 900 | 800 | 90 | 0.39 | 85 | Excellent |
| 4 | EVA-1/F-1 (40/60) | 2500 | 800 | 850 | 92 | 0.4 | 95 | Excellent |
| 5 | EVA-1/F-1 (30/70) | 2220 | 800 | 900 | 93 | 0.41 | >100 | Excellent |

The data for Examples 1 through 5 in Table 1 shows that the films are all HF-weldable, even for Example 5 comprising 70 weight % of E/EHM. In contrast, E/EHM (Comparative Example C2) cannot be HF welded. Temperature resistance is significantly better than Comparative Example C1 Examples 1 through 5 also show improved tensile strength at 100% elongation, Shore A hardness and tear strength over Comparative Example C1.

Table 2 summarizes the properties of blends of an ethylene/methyl acrylate copolymer (EMA-1) with E/EHM (F-1). The blends have higher temperature resistance than pure EMA-1. Unexpected is the ability of blends of ethylene/methyl acrylate copolymer with E/EHM to be HF-welded. For HF-welding, ethylene/methyl acrylate copolymers such as Comparative Example C3 require higher voltage and longer dwell times to achieve even weak seals. As shown in Table 1, E/EHM (C2) cannot be HF-welded. Based on these results, blends of EMA and E/EHM would be expected to be incapable of HF-welding. However, the blends can be HF-welded without any obvious problems.

TABLE 2

Blends of E/EHM and Ethylene/Methyl acrylate Copolymers

| Example | Composition (weight ratio) | Tensile Strength (psi) | Elongation at Break (%) | Tensile Strength at 100% Elongation (psi) | Shore A Hardness (psi) | Tear Strength lb/mil resistance | Temperature Resistance (° C.) | HF Welding |
|---|---|---|---|---|---|---|---|---|
| C3 | EMA-1 | 1780 | 1000 | 500 | 82 | 0.25 | 75 | poor |
| 6 | F-1/EMA-1 (40/60%) | 1800 | 840 | 750 | 88 | 0.32 | 90 | excellent |
| 7 | F-1/EMA-1 (60/40%) | 1820 | 760 | 980 | 91 | 0.38 | 100 | good |

The novel properties of the blends of this invention can be better appreciated by comparing with the blends of EVA with monofunctional acid copolymers. By chemical nature, E/EHM is an acid copolymer like monofunctional acid copolymers ethylene/methacrylic acid copolymers such as EMAA-1 and EMAA-2 or ethylene/acrylic acid copolymers, such as EAA-1. However, the properties of the two blend systems are significantly different. For comparison, Table 3 summarizes the properties of blends of EVA-1 with monofunctional acid copolymers EAA-1, EMAA-1 or EMAA-2 (Comparative Examples C5 through C12).

The blends of EVA-1 with EAA-1, EMAA-1 or EMAA-2 exhibit improved temperature resistance, as do the blends of EVA-1 and F-1 shown in Table 1. However, the presence of EAA-1, EMAA-1 or EMAA-2 in blends with EVA greatly deteriorates the HF-weldability of the blends. For the blends where EVA-1 is the major component, higher voltage is needed to get satisfactory welding. For blends where EVA-1 is the minor component, the blends cannot be HF-welded.

TABLE 3

Blends of EVA and Acid Copolymers

| Example | Composition (weight ratio) | Tensile Strength (psi) | Elongation at Break (%) | Tensile Strength at 100% Elongation (psi) | Shore A Hardness (psi) | Tear Strength lb/mil resistance | Temperature Resistance | HF Welding |
|---|---|---|---|---|---|---|---|---|
| C1 | EVA-1 | 3130 | 1000 | 650 | 86 | 0.35 | 60 | Excellent |
| C4 | EAA-1 | 3000 | 620 | 1540 | 93 | 0.5 | 85 | no |
| C5 | EVA-1/EAA-1 (60/40) | 2500 | 770 | 850 | 88 | 0.44 | 80 | good |
| C6 | EVA-1/EAA-1 (40/60) | 2300 | 660 | 950 | 92 | 0.47 | 85 | poor |
| C7 | EMAA-1 | 2280 | 650 | 1450 | 94 | 0.51 | 100 | no |
| C8 | EVA-1/EMAA-1 (60/40) | 2480 | 820 | 850 | 90 | 0.41 | 90 | good |
| C9 | EVA-1/EMAA-1 (40/60) | 2030 | 680 | 1050 | 91 | 0.47 | 95 | no |
| C10 | E/MAA-2 | 3000 | 620 | 1530 | 93 | 0.53 | 90 | no |
| C11 | EVA-1/EMAA-2 (60/40) | 2715 | 800 | 900 | 90 | 0.46 | 85 | good |
| C12 | EVA-1/EMAA-2 (40/60) | 2630 | 710 | 1090 | 91 | 0.4 | 90 | no |

Table 4 summarized the properties of cast film Examples. The cast films all exhibited excellent optical clarity with low haze up to 25-mil thickness. The Examples are readily HF-welded with high weld strength; the two plies of films cannot be separated after HF-welding without rupture of the seal. To study the weld strength at elevated temperature, two plies of the film of Example 9, having a length of six inches and a width of one inch, were HF-welded at 4.5 kV for 3 seconds of weld time and then held together under pressure for 2 seconds. The sample was subjected to a creep test in an oven. A 100-gram weight was attached to the end of one ply of the HF-welded sample, while the end of the other ply was hung from the top of the oven with the temperature set at 80° C. for 30 minutes. The film survived the creep test without tearing apart the weld line.

TABLE 4

Cast Film Examples

| Example | Composition (weight ratio) | Cast Film Thickness | Haze | HF Welding |
|---|---|---|---|---|
| 8 | EVA-1/F-1 (60/40) | 10 mil | 8 | excellent |
| 9 | EVA-1/F-1 (60/40) | 25 mil | 11 | excellent |
| 10 | EMA-6/F-1 (70/30) | 20 mil | 11 | excellent |
| 11 | EVA-1/F-1/PP-1 (54/26/20) | 10 mil | 26 | excellent |

Example 12

Example 12 is a blend of EVA-1/EVA-2/F-1 (50/10/40 weight ratio) with MI of 7 measured at 190° C. The blend was extrusion coated onto Kraft Paper using a coating line equipped with a 4.5-inch diameter (126-inch length) single-screw extruder, an ER-WE-PA (Egan-Davis Standard Company) feedblock and a Cloeren Edge Reduction die. The resulting structure was a coated paper having a 1.0 mil coating of Example 12 on the paper. Melt temperature was 445° F. for Example 12. The melt strength of Example 12 was high enough to show a stable neck-in and uniform coating thickness across the web at various line speeds.

The line speed was varied from 250 feet per minute to 660 feet per minute without encountering an edge tearing or weaving problem with the melt curtain. The adhesion strength of the coating to the Kraft paper was excellent. The coating cannot be separated from the paper without causing a fiber tear.

In a similar manner, Example 12 was extrusion coated onto 2-mil aluminum foil. The resulting structure was a coated foil having a 1.0-mil coating of Example 12 on the foil. The adhesion strength of the coating to the foil was fair. The coating can be separated from the foil.

Having thus described and exemplified the invention with a certain degree of particularity, it should be appreciated that the following claims are not to be so limited but are to be afforded a scope commensurate with the wording of each element of the claim and equivalents thereof.

What is claimed is:

1. A multilayer structure comprising
A. at least one low haze polymeric film layer having a thickness of up to 25 mil that is high-frequency weldable and optically clear, wherein the composition of said low haze polymeric film layer is a polymeric blend composition consisting of
1. a first ethylene copolymer prepared by high pressure free radical copolymerization and consisting essentially of copolymerized units of ethylene and 3-15 weight % copolymerized units of a comonomer selected from the group consisting of maleic anhydride, maleic acid monoesters, maleic acid diesters, fumaric acid monoesters, itaconic acid monoesters and mixtures thereof, said first ethylene copolymer being present in the polymeric blend composition in an amount of from about 5 to about 95 weight % of the polymeric blend composition; and
2. at least one second ethylene copolymer, different from said first ethylene copolymer, consisting essentially of copolymerized units of ethylene and copolymerized units of a polar comonomer selected from the group consisting of vinyl acetate, alkyl acrylates, alkyl methacrylates, carbon monoxide and mixtures of two or more thereof, wherein said polar comonomer is present in the second ethylene copolymer in an amount of from 6 to 40 weight %, the second ethylene copolymer being present in the polymeric blend composition in an amount from about 5 to about 95 weight % of the polymeric blend composition;
wherein the haze value of the low haze polymeric film layer is 11 or less; and
B. at least one additional layer comprising a substrate selected from the group consisting of thermoplastic sheets, cellular foams, woven and non-woven fabrics, textiles, foils, paperboard products, leather and leather-like products, wood veneer and wood products, and wood and cellulosic composites.

2. A multilayer structure of claim 1 prepared by extrusion coating at least one layer of the polymer blend composition onto the substrate.

3. A multilayer structure of claim 1 prepared by applying the polymer blend composition onto the substrate by powder scattering, powder dot application or paste dot application.

4. An article of manufacture comprising at least one low haze film layer as recited in claim 1, wherein the at least one low haze polymeric film layer is adhered to a woven or non-woven textile.

5. An article of manufacture of claim 4, wherein the at least one low haze polymeric film layer has been adhered to the woven or nonwoven textile by thermal lamination.

6. An article of manufacture of claim 5, wherein the article comprises flocking.

7. A multilayer structure of claim 1 wherein the first ethylene copolymer of the polymeric blend composition is obtained by copolymerization of ethylene and maleic anhydride.

8. A multilayer structure of claim 1 wherein the first ethylene copolymer of the polymeric blend composition is obtained by copolymerization of ethylene and a comonomer selected from the group consisting of maleic acid diesters, maleic acid monoesters, fumaric acid monoesters, itaconic acid monoesters, and mixtures of two or more thereof.

9. A multilayer structure of claim 8 wherein the maleic acid diesters or maleic acid monoesters are esters of $C_1$ to $C_4$ alcohols.

10. A multilayer structure of claim 9 wherein the first ethylene copolymer of the polymeric blend composition is obtained by copolymerization of ethylene and a maleic acid monoester.

11. A multilayer structure of claim 10 wherein the maleic acid monoester is ethyl hydrogen maleate.

12. A multilayer structure of claim 11 wherein the second ethylene copolymer of the polymeric blend composition is an ethylene/vinyl acetate copolymer.

13. A multilayer structure comprising
A. at least one low haze polymeric film layer having a thickness of up to 25 mil that is high-frequency weldable and optically clear, wherein the composition of said low haze polymeric film layer is a polymeric blend composition consisting of
1. a first component consisting essentially of
a. from about 5 to about 95 weight percent of a first ethylene copolymer prepared by high pressure free radical copolymerization and consisting essentially of copolymerized units of ethylene and 3-15 weight % copolymerized units of a comonomer selected from the group consisting of maleic anhydride, maleic acid monoesters, maleic acid diesters, fumaric acid monoesters, itaconic acid monoesters and mixtures thereof; and
b. from about 95 to about 5 weight percent of at least one second ethylene copolymer, different from said first ethylene copolymer, consisting essentially of copolymerized units of ethylene and copolymerized units of a polar comonomer selected from the group consisting of vinyl acetate, alkyl acrylates, alkyl methacrylates, carbon monoxide and mixtures of two or more thereof, wherein said polar comonomer is present in the second ethylene copolymer in an amount of from 6 to 40 weight %,
the weight percentages of said first ethylene copolymer and said at least one second ethylene copolymer being based on the total weight of the first ethylene copolymer and the at least one second ethylene copolymer; and
2. up to 25 weight percent, based on the total weight of the polymer blend composition, of an additional polymeric component that is a polyolefin;
wherein the haze value of the low haze polymeric film layer is 26 or less; and
B. at least one additional layer comprising a substrate selected from the group consisting of cellular foams, woven and non-woven fabrics, textiles, foils, paperboard products, leather and leather-like products, wood veneer and wood products, and wood and cellulosic composites.

14. A multilayer structure of claim 13 wherein the first ethylene copolymer of the first component is prepared by copolymerization of ethylene and maleic anhydride.

15. A multilayer structure of claim 14 wherein the first ethylene copolymer of the first component is prepared by copolymerization of ethylene and a maleic acid monoester.

16. A multilayer structure of claim 15 wherein the maleic acid monoester is ethyl hydrogen maleate.

17. A multilayer structure of claim 13 wherein the polyolefin is selected from the group consisting of polyethylene homopolymers, polyethylene copolymers, polypropylene homopolymers, polypropylene copolymers, and mixtures of two or more thereof.

18. A multilayer structure of claim 17 wherein the polyolefin is a polyethylene copolymer.

19. A multilayer structure of claim 17 wherein the polyolefin is a polypropylene homopolymer.

* * * * *

UNITED STATES PATENT AND TRADEMARK OFFICE
CERTIFICATE OF CORRECTION

PATENT NO.         : 8,057,910 B2
APPLICATION NO.    : 12/972847
DATED              : November 15, 2011
INVENTOR(S)        : Chou et al.

It is certified that error appears in the above-identified patent and that said Letters Patent is hereby corrected as shown below:

Item (54) and Col. 1 line 1 and 2

Title should read --BLENDS OF ETHYLENE COPOLYMERS WITH HIGH-FREQUENCY WELDABILITY--

Signed and Sealed this
Twelfth Day of June, 2012

David J. Kappos
*Director of the United States Patent and Trademark Office*